(12) United States Patent
Kardos et al.

(10) Patent No.: US 8,590,494 B2
(45) Date of Patent: Nov. 26, 2013

(54) ARRANGEMENT IN A LOW-TEMPERATURE COOLING SYSTEM FOR A SUPERCHARGED COMBUSTION ENGINE

(75) Inventors: Zoltan Kardos, Södertälje (SE); Erik Söderberg, Stockholm (SE)

(73) Assignee: Scania CV AB (SE)

( * ) Notice: Subject to any disclaimer, the term of this patent is extended or adjusted under 35 U.S.C. 154(b) by 286 days.

(21) Appl. No.: 13/062,237

(22) PCT Filed: Sep. 14, 2009

(86) PCT No.: PCT/SE2009/051017
§ 371 (c)(1),
(2), (4) Date: Mar. 4, 2011

(87) PCT Pub. No.: WO2010/036185
PCT Pub. Date: Apr. 1, 2010

(65) Prior Publication Data
US 2011/0162596 A1    Jul. 7, 2011

(30) Foreign Application Priority Data
Sep. 25, 2008   (SE) ........................ 0802031

(51) Int. Cl.
*F01P 9/00*     (2006.01)
*F01P 7/14*     (2006.01)
*F02B 33/44*    (2006.01)

(52) U.S. Cl.
USPC ................ 123/41.01; 60/605.2; 123/41.08

(58) Field of Classification Search
USPC ............... 123/41.02, 41.42, 41.03; 60/605.1, 60/605.2
See application file for complete search history.

(56) References Cited

U.S. PATENT DOCUMENTS 6,230,668 B1    5/2001   Marsh et al.
(Continued)

FOREIGN PATENT DOCUMENTS

| EP | 2096276 A1 | 9/2009 |
|---|---|---|
| JP | 58150022 A | 9/1983 |

(Continued)

OTHER PUBLICATIONS

International Search Report dated Dec. 18, 2009, issued in corresponding international application No. PCT/SE2009/051017.

*Primary Examiner* — Lindsay Low
*Assistant Examiner* — Syed O Hasan
(74) *Attorney, Agent, or Firm* — Ostrolenk Faber LLP

(57) ABSTRACT

An arrangement for controlling cooling of a gas for a supercharged combustion engine includes a low temperature cooling system with a coolant, a coolant pump circulating the coolant in the cooling system, a cooler in which a gas containing water vapor is cooled by the coolant, at least one sensor for detecting a parameter indicating whether the gas is cooled so much that there is at least risk of ice formation in the cooler, and a control unit receiving information from the sensors and deciding whether there is at least risk of ice formation in the cooler and, if so, controlling the coolant pump to be temporarily switched off or to circulate a lower than normal flow of coolant through the cooler.

10 Claims, 2 Drawing Sheets

(56) References Cited

U.S. PATENT DOCUMENTS

| | | | |
|---|---|---|---|
| 6,244,256 B1 * | 6/2001 | Wall et al. | 123/568.12 |
| 6,530,347 B2 * | 3/2003 | Takahashi et al. | 123/41.1 |
| 7,617,679 B2 * | 11/2009 | Kardos et al. | 60/605.2 |
| 7,716,929 B2 * | 5/2010 | Pelz et al. | 60/605.2 |
| 2003/0056772 A1 | 3/2003 | Borrmann et al. | |
| 2007/0028902 A1 | 2/2007 | Nigoro et al. | |
| 2008/0190109 A1 * | 8/2008 | Kardos et al. | 60/605.2 |

FOREIGN PATENT DOCUMENTS

| | | |
|---|---|---|
| WO | WO 02/48516 A1 | 6/2002 |
| WO | WO 2007/108761 A1 | 9/2007 |
| WO | WO 2008/066472 * | 5/2008 |
| WO | WO 2008/080872 A1 | 7/2008 |

\* cited by examiner

ARRANGEMENT IN A LOW-TEMPERATURE COOLING SYSTEM FOR A SUPERCHARGED COMBUSTION ENGINE

CROSS-REFERENCE TO RELATED APPLICATIONS

The present application is a 35 U.S.C. §§371 national phase conversion of PCT/SE2009/051017, filed Sep. 14, 2009 which claims priority of Swedish Application No. 0802031-5, filed Sep. 25, 2008, the contents of which are incorporated by reference herein. The PCT International Application was published in the English language.

BACKGROUND TO THE INVENTION, AND STATE OF THE ART

The present invention relates to an arrangement for cooling gases used for a supercharged combustion engine.

The amount of air which can be supplied to a supercharged combustion engine depends on the pressure of the air but also on the temperature of the air. Supplying the largest possible amount of air to the combustion engine entails effective cooling of the air before it is led to the combustion engine. The air is usually cooled in a charge air cooler arranged at a front portion of a vehicle. At that location the charge air cooler has a cooling air flow at the temperature of the surroundings flowing through it, which makes it possible for the compressed air to be cooled to a temperature close to the temperature of the surroundings. In cold weather conditions, the compressed air may be cooled to a temperature below the dewpoint temperature of the air, resulting in precipitation of water vapour in liquid form in the charge air cooler. When the temperature of the surrounding air is lower than 0° C., there is also risk of the precipitated water freezing to ice within the charge air cooler. Such ice formation will cause a greater or lesser amount of obstruction of the air flow ducts within the charge air cooler, resulting in a reduced flow of air to the combustion engine and consequent operational malfunctions or stoppages.

The technique known as EGR (exhaust gas recirculation) is a known way of recirculating part of the exhaust gases from a combustion process in a combustion engine. The recirculating exhaust gases are mixed with the inlet air to the combustion engine before the mixture is led to the cylinders of the combustion engine. Adding exhaust gases to the air causes a lower combustion temperature, resulting inter alia in a reduced content of nitrogen oxides $NO_x$ in the exhaust gases. This technique is used both for Otto engines and for diesel engines. Supplying a large amount of exhaust gases to the combustion engine entails effective cooling of the exhaust gases before they are led to the combustion engine. The exhaust gases may be subjected to a first step of cooling in an EGR cooler which is cooled by coolant from the combustion engine's cooling system, and a second step of cooling in an air-cooled EGR cooler. The exhaust gases can thus also be cooled to a temperature close to the temperature of the surroundings. Exhaust gases contain water vapour which condenses within the EGR cooler when the exhaust gases undergo the second step of cooling to a temperature which is lower than the dewpoint of the water vapour. When the temperature of the surroundings is below 0° C., there is also risk of the condensate formed freezing to ice within the second EGR cooler. Such ice formation will cause a greater or lesser amount of obstruction of the exhaust gas flow ducts within the EGR cooler. When the recirculation of exhaust gases ceases or is considerably reduced, the result is an increased content of nitrogen oxides in the exhaust gases.

SUMMARY OF THE INVENTION

The object of the present invention is to provide an arrangement whereby a gaseous medium which contains water vapour can be subjected to very good cooling in a cooler while at the same time the risk of the cooler being obstructed is eliminated.

This object is achieved with the arrangement of the kind mentioned in the introduction which is characterised by the features indicated in the characterising part of claim 1. For it to be possible for the gaseous medium to be effectively cooled, it needs to be cooled by a coolant which is at a low temperature. A cooling system which contains such a coolant may be referred to as a low-temperature cooling system. When coolant in a low-temperature cooling system is used, the gaseous medium is usually cooled to a temperature at which water in liquid form is precipitated within the cooler. If the coolant is also colder than 0° C., there is obvious risk of the water freezing to ice within the cooler. The lower the temperature of the coolant in the low-temperature cooling system, the greater this risk. The invention therefore uses at least one sensor which detects a parameter which indicates whether the gaseous medium is cooled so much that there is ice formation or risk of ice formation in the cooler. When there is such risk, the control unit switches off the coolant pump in the low-temperature cooling system or reduces the speed of the coolant pump to a suitable value. The control unit may be a computer unit with suitable software for the purpose. The cooling effect provided in a coolant-cooled cooler is related to the coolant's temperature and the coolant flow through the cooler. By thus completely stopping or reducing the coolant flow through the cooler, it is therefore possible for the cooling effect undergone by the gaseous medium in the cooler to be reduced quickly and effectively when there is risk of ice formation. When the risk of ice formation is over, the control unit reactivates the coolant pump so that it circulates a normal coolant flow through the cooler. By such intermittent activation of the coolant pump it is possible for the gaseous medium to be cooled to a low temperature and kept within a temperature range in which there is no risk of its being cooled to such a low temperature that ice will form within the cooler when a low ambient temperature prevails. With such control of the coolant pump, no extra energy supply is required for warming the coolant or melting any ice, and energy utilisation is rather reduced in situations in which the coolant pump is not running.

According to a preferred embodiment of the invention, said sensor is a temperature sensor adapted to detecting a temperature which indicates whether the gaseous medium is cooled so much that there is ice formation or risk of ice formation in the cooler. With advantage, the temperature sensor may detect the temperature of the gaseous medium after it has been cooled in the cooler. Alternatively, said sensor may be a pressure sensor which detects a parameter related to the pressure of the gaseous medium leaving the cooler or the pressure drop of the medium in the cooler. The control unit is with advantage adapted to controlling the coolant pump in such a way that the latter is switched off temporarily or circulates a reduced flow of coolant through the cooler when the control unit receives a parameter value which is below a lower threshold value. That threshold value may take the form of a lowest temperature value or pressure value which should not be undershot. The lower threshold value is preferably set with a suitable margin to a critical value at which ice formation will take place in the cooler. If a temperature sensor is used which detects the temperature of the medium after it has been cooled in the cooler, the critical temperature value is usually 0° C. Using a lower threshold value which is a suitable number of degrees above 0° C. will ensure that ice formation cannot occur in the cooler.

According to another preferred embodiment of the invention, the control unit is adapted to controlling the coolant pump so that it again circulates a normal flow of coolant through the cooler when it receives a parameter value which exceeds an upper threshold value. When the coolant pump is switched off or circulates a reduced flow through the cooler, the gaseous medium undergoes reduced cooling in the cooler. The gaseous medium leaving the cooler will therefore be at a progressively rising temperature. When the temperature of the medium has risen to the upper threshold value, the control unit will find that the risk of ice formation is at least temporarily over, after which it will restart the coolant pump. The coolant pump is with advantage powered electrically. Such a coolant pump can easily be switched on and off.

There is also the possibility of regulating the speed of an electric coolant pump to provide a desired coolant flow through the cooler.

According to another preferred embodiment of the invention, said low-temperature cooling system comprises a radiator element in which the circulating coolant is cooled by air at the temperature of the surroundings. The coolant may thus be cooled to a temperature close to the temperature of the surroundings. In favourable circumstances, the coolant can therefore also effect cooling of the gaseous medium to a temperature close to the temperature of the surroundings.

According to another preferred embodiment of the invention, the arrangement comprises a further cooler in which the gaseous medium is intended to be subjected to a first step of cooling by the coolant in a high-temperature cooling system before the gaseous medium is led to the aforesaid cooler in which it undergoes a second step of cooling by the coolant in the low-temperature cooling system. The gaseous medium may be compressed air which is led into an inlet line to the combustion engine. When air is compressed, it undergoes an amount of heating which is related to the degree of compression of the air. In supercharged combustion engines, air is being used at an ever higher pressure. The air therefore requires effective cooling. Accordingly, it is advantageous to cool the compressed air in more than one so-called charge air cooler and in two or more stages so that it can reach a desired low temperature before it is led to the combustion engine. Said gaseous medium may also be recirculating exhaust gases which are led in a return line to the combustion engine. The exhaust gases may be at a temperature of 500-600° C. when they are led into the return line. It is therefore also advantageous to cool the exhaust gases in more than one so-called EGR cooler and in two or more stages so that they can reach a desired low temperature before they are led to the combustion engine. The cooling system which cools a combustion engine is at a temperature of 80-100° C. during normal operation. This cooling system may therefore be referred to as a high-temperature cooling system. It is therefore very advantageous to use this existing cooling system for subjecting the gaseous medium to a first step of cooling.

BRIEF DESCRIPTION OF THE DRAWINGS

An embodiment of the invention is described below by way of example with reference to the attached drawings, in which.

DETAILED DESCRIPTION OF A PREFERRED EMBODIMENT OF THE INVENTION

Figure 1:
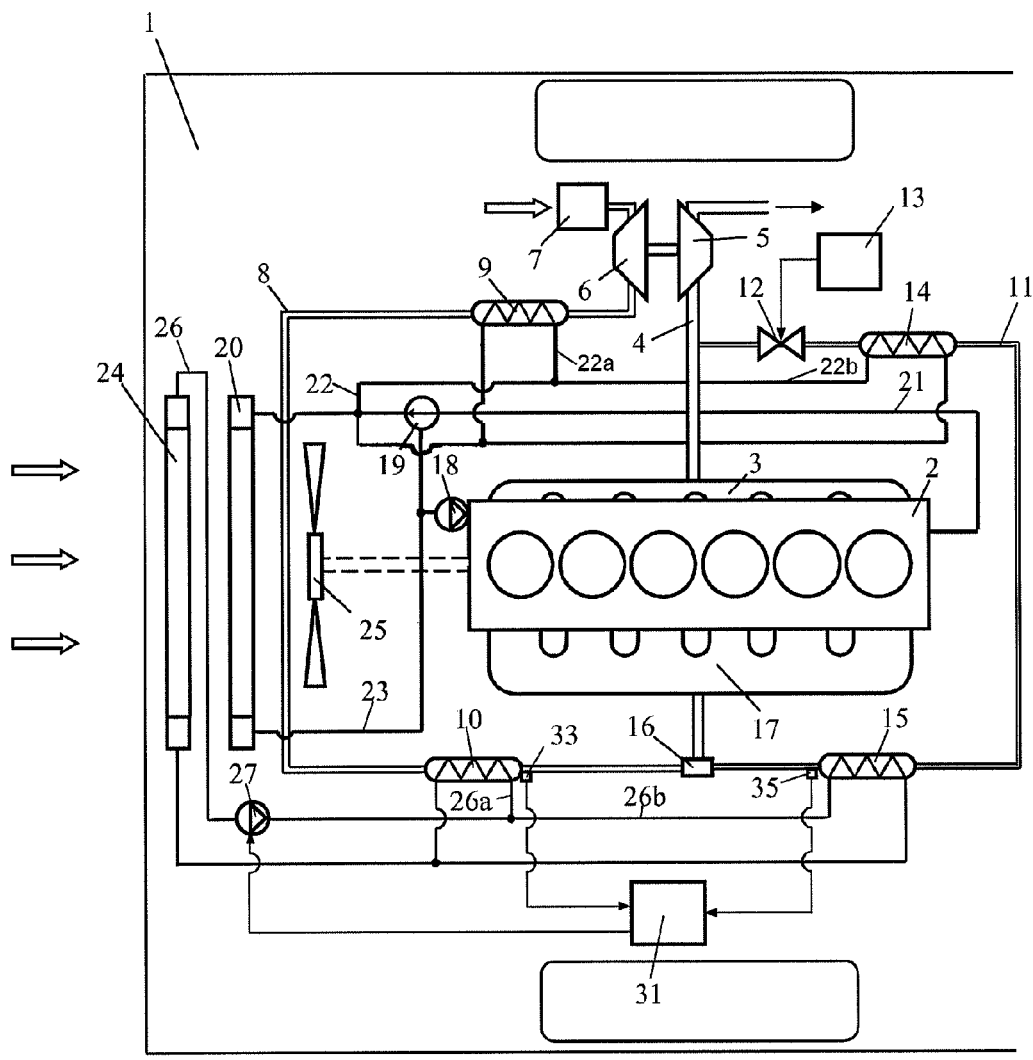
FIG. 1 depicts an arrangement for a supercharged combustion engine according to a first embodiment of the invention and FIG. 2 depicts a diagram of how the temperature of the compressed air and the temperature of the recirculating exhaust gases may vary with time t during operation of the combustion engine.

FIG. 1 depicts an arrangement for a supercharged combustion engine which is intended to power a schematically depicted vehicle 1. The combustion engine is here exemplified as a diesel engine 2. The diesel engine 2 may be intended to power a heavy vehicle 1. The exhaust gases from the cylinders of the diesel engine 2 are led via an exhaust manifold 3 to an exhaust line 4. The diesel engine 2 is provided with a turbo unit which comprises a turbine 5 and a compressor 6. The exhaust gases in the exhaust line 4, which are at above atmospheric pressure, are led initially to the turbine 5. The turbine 5 is thus provided with driving power which is transferred, via a connection, to the compressor 6. The compressor 6 uses this power to compress air which is drawn into an air inlet line 8 via an air filter 7. The air in the inlet line is cooled initially in a first coolant-cooled charge air cooler 9. The air is cooled in the first charge air cooler 9 by coolant from the combustion engine's cooling system. The compressed air is thereafter cooled in a second coolant-cooled charge air cooler 10. The air is cooled in the second charge air cooler 10 by coolant from a low-temperature cooling system, i.e. a cooling system which has a coolant at a relatively low temperature.

The arrangement comprises a return line 11 for effecting recirculation of part of the exhaust gases in the exhaust line 4. The return line 11 has an extent between the exhaust line 4 and the inlet line 8. The return line 11 comprises an EGR valve 12 by which the exhaust flow in the return line 11 can be shut off. The EGR valve 12 may also be used for regulating the amount of exhaust gases which are led from the exhaust line 4 to the inlet line 8 via the return line 11. A control unit 13 is adapted to controlling the EGR valve 12 on the basis of information about the current operating state of the diesel engine 2. The return line 11 comprises a first coolant-cooled EGR cooler 14 for subjecting the exhaust gases to a first step of cooling. The exhaust gases are cooled in the first EGR cooler 14 by coolant from the combustion engine's cooling system. The exhaust gases are subjected to a second step of cooling in a coolant-cooled EGR cooler 15. The exhaust gases are cooled in the second EGR cooler 15 by coolant from the low-temperature cooling system.

In certain operating situations in supercharged diesel engines 2, the pressure of the exhaust gases in the exhaust line 4 will be lower than the pressure of the compressed air in the inlet line 8. In such operating situations it is not possible to mix the exhaust gases in the return line 11 directly with the compressed air in the inlet line 8 without special auxiliary means. To this end it is possible to use, for example, a venturi 16 or a turbo unit with variable geometry. If instead the combustion engine 2 is a supercharged Otto engine, the exhaust gases in the return line 11 can be led directly into the inlet line 8, since the exhaust gases in the exhaust line 4 of an Otto engine in substantially all operating situations will be at a higher pressure than the compressed air in the inlet line 8. When the exhaust gases have mixed with the compressed air in the inlet line 8, the mixture is led to the respective cylinders of the diesel engine 2 via a manifold 17.

The combustion engine 2 is cooled in a conventional manner by a cooling system which contains a circulating coolant. The coolant is circulated in the cooling system by a coolant pump 18. A main flow of the coolant is circulated through the combustion engine 2. After the coolant has cooled the combustion engine 2, it is led in a line 21 to a thermostat 19 in the cooling system. When the coolant has reached a normal operating temperature, the thermostat 19 is adapted to leading it to a radiator 20 fitted at a forward portion of the vehicle, in order to be cooled. A smaller portion of the coolant in the cooling system is nevertheless not led back to the combustion engine 2 through radiator 20 and return line 23, but is circulated through a line 22 which divides into two parallel lines 22a, 22b. The line 22a leads coolant to the first charge air cooler 9, in which it subjects the compressed air to a first step of cooling. The line 22b leads coolant to the first EGR cooler 14, in which it subjects the recirculating exhaust gases to a first step of cooling. The coolant which has cooled the air in the first charge air cooler 9 and the coolant which has cooled the exhaust gases in the first EGR cooler 14 are reunited in the line 22, which leads the coolant back to the line 21. The warm coolant is led in the line 21 to the radiator 20.

The low-temperature cooling system comprises a radiator element 24 fitted in front of the radiator 20 in a peripheral region of the vehicle 1. In this case the peripheral region is situated at a front portion of the vehicle 1. A radiator fan 25 is adapted to generating an air stream of surrounding air through the radiator element 24 and the radiator 20. As the radiator element 24 is situated in front of the radiator 20, the coolant in the radiator element 24 is cooled by air at the temperature of the surroundings. The coolant in the radiator element 24 can thus be cooled to a temperature close to the temperature of the surroundings. The cold coolant from the radiator element 24 is circulated in the separate cooling system in a line 26 by an electrically powered coolant pump 27. The line 26 divides into two parallel lines 26a, 26b. The line 26a leads coolant to the second charge air cooler 10, in which it subjects the compressed air to a second step of cooling. The line 26b leads coolant to the second EGR cooler 15, in which it subjects the recirculating exhaust gases to a second step of cooling. After the coolant has passed through the second charge air cooler 10 and the second EGR cooler 15, the lines 26a, 26b reunite. The coolant is thereafter led in the line 26 to the radiator element 24 in order to be cooled. A first temperature sensor 33 is provided in the air line 8 to detect the temperature of the air after it has been cooled in the second charge air cooler 10. A second temperature sensor 35 is provided in the return line 11 to detect the temperature of the exhaust gases after they have been cooled in the second EGR cooler 15. The control unit 31 is adapted to receiving information from the temperature sensors 33, 35 concerning the temperature of the air and of the exhaust gases.

During operation of the diesel engine 2, exhaust gases flow through the exhaust line 4 and drive the turbine 5. The turbine 5 is thus provided with driving power which drives the compressor 6. The compressor 6 draws surrounding air in via the air filter 7 and compresses the air in the inlet line 8. The air thus acquires an increased pressure and an increased temperature. The compressed air is cooled in the first charge air cooler 9 by the radiator liquid in the combustion engine's cooling system. The radiator liquid may here be at a temperature of about 80-85° C. Thus the compressed air can undergo in the first charge air cooler 9 a first step of cooling to a temperature close to the temperature of the coolant. The compressed air is thereafter led through the second charge air cooler 10, in which it is cooled by the coolant in the separate cooling system. The coolant may here be at a temperature close to the temperature of the surroundings. Thus the compressed air can in favourable circumstances be cooled to a temperature close to the temperature of the surroundings.

In most operating states of the diesel engine 2, the control unit 13 will keep the EGR valve 12 open so that part of the exhaust gases in the exhaust line 4 are led into the return line 11. The exhaust gases in the exhaust line 4 may be at a temperature of about 500-600° C. when they reach the first EGR cooler 14. The recirculating exhaust gases undergo in the first EGR cooler 14 a first step of cooling by the coolant in the combustion engine's cooling system. The coolant in the combustion engine's cooling system will thus be at a relatively high temperature but definitely lower than the temperature of the exhaust gases. It is thus possible to effect good cooling of the exhaust gases in the first EGR cooler 14. The recirculating exhaust gases are thereafter led to the second EGR cooler 15, in which they are cooled by the coolant in the low-temperature cooling system. The coolant will here be at a definitely lower temperature and the exhaust gases can in favourable circumstances be cooled to a temperature close to the temperature of the surroundings. Exhaust gases in the return line 11 can thus undergo cooling to substantially the same low temperature as the compressed air before they mix and are led to the combustion engine 2. A substantially optimum amount of air and recirculating exhaust gases can thus be led into the combustion engine. Combustion in the combustion engine 2 with substantially optimum performance is thus made possible. The low temperature of the compressed air and the recirculating exhaust gases also results in a lower combustion temperature and hence a lower content of nitrogen oxides in the exhaust gases.

This effective cooling of the compressed air and the recirculating exhaust gases also has disadvantages. The compressed air is cooled in the second charge air cooler 10 to a temperature at which water in liquid form precipitates within the charge air cooler 10. Similarly, the exhaust gases in the second EGR cooler 15 are cooled to a temperature at which condensate forms within the second EGR cooler 15. When the temperature of the surrounding air is lower than 0° C., there is also risk of the precipitated water freezing to ice within the second charge air cooler 10 and of the precipitated condensate freezing to ice within the second EGR cooler 15. Ice formation within the second charge air cooler 10 and the second EGR cooler 15 might seriously disturb the operation of the combustion engine 2. To prevent the second charge air cooler 10 and the second EGR cooler 15 from freezing up, the control unit 31 substantially continuously receives information from the temperature sensor 33 concerning the temperature $T_A$ of the air after it has been cooled in the second charge air cooler 10 and from the temperature sensor 35 concerning the temperature $T_E$ of the recirculating exhaust gases after they have been cooled in the second charge air cooler 15.

Figure 2:
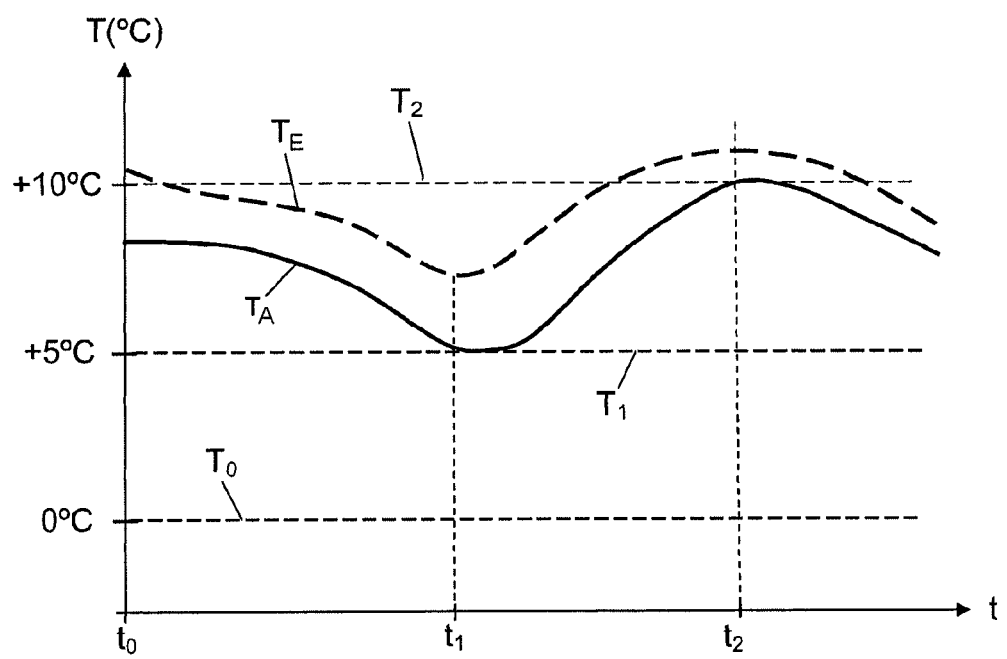

FIG. 2 depicts a diagram illustrating how the temperature $T_A$ of the compressed air and the temperature $T_E$ of the recirculating exhaust gases may vary with time t during operation of the combustion engine 2. A critical temperature value $T_0=0°$ C. is marked in the diagram at which ice formation is very likely to occur in the charge air cooler 10 and the EGR cooler 15. The diagram marks a lower threshold value $T_1$ which is set with a suitable margin to the critical value $T_0$. In this case the lower threshold value $T_1=5°$ C. The diagram also marks an upper threshold value $T_2$ which in this case is set at 10° C. At time $t_0$, the compressed air has a temperature $T_A$ of about 8° C. when it leaves the second charge air cooler 10 and the exhaust gases a temperature $T_E$ of about 11° C. when they leave the second EGR cooler 15. At time $t_0$, the control unit 31 runs the coolant pump 27 in such a way as to provide a normal coolant flow through the second charge air cooler 10 and the second EGR cooler 15. In this example the surrounding air is at a relatively low temperature. The coolant in the low-temperature cooling system is thus cooled in the cooler radiator element 24 to an almost equally low temperature. This cold coolant effects very effective cooling of the compressed air in the second charge air cooler 10 and the exhaust gases in the second EGR cooler 15. The temperature $T_A$ of the compressed air and the temperature $T_E$ of the exhaust gases consequently drop over time t.

At time $t_1$ the temperature $T_A$ of the compressed air has dropped to the lower threshold value $T_1$. When the control unit 31 receives this information from the temperature sensor 33, it switches the coolant pump 27 off so that the circulation of coolant in the low-temperature cooling system ceases. The cooling of the compressed air in the second charge air cooler 10 and the exhaust gases in the second EGR cooler 15 is thus considerably reduced. This leads to the temperature $T_A$ of the compressed air ceasing to drop. The temperature $T_A$ of the compressed air is thus prevented, with a margin, from approaching the critical temperature $T_0$ at which ice forms in the second charge air cooler 10. As the circulation of cold coolant through the second charge air cooler 10 and the second EGR cooler 15 has ceased, the temperature $T_A$ of the compressed air begins to rise, as too does the temperature $T_E$ of the exhaust gases. At time $t_2$ temperature $T_A$ of the compressed air has risen to the upper threshold value $T_2$. The temperature $T_E$ of the exhaust gases in this case is somewhat above the threshold value $T_2$. When the control unit 31 receives information from the temperature sensor 33 which indicates that the temperature $T_A$ of the compressed air has risen to the upper threshold $T_2$, it finds that the risk of ice formation is at least temporarily over. The control unit 31 thereupon switches the coolant pump 27 on so that the circulation of coolant resumes in the low-temperature cooling system. The resumed circulation of cold coolant leads again to very effective cooling of the compressed air in the second charge air cooler 10 and the exhaust gases in the second EGR cooler 15. The temperature $T_A$ of the compressed air therefore ceases to rise. The temperature $T_A$ of the compressed air and the temperature $T_E$ of the exhaust gases thereafter begin to fall again. In this example, the coolant pump 27 is switched off when the temperature $T_A$ of the compressed air reaches the lower threshold value $T_1$. If instead the temperature $T_E$ of the exhaust gases cools down first to the lower threshold value $T_1$, the control unit 31 here again switches the coolant pump 27 off. The coolant pump 27 is kept switched off until the control unit 31 receives information from the temperature sensor 35 which indicates that the temperature $T_E$ of the exhaust gases has risen to the upper threshold value $T_2$. When this happens, the control unit switches the coolant pump 27 back on.

When a low ambient temperature prevails, the control unit 31 activates the coolant pump 27 intermittently so that a reduced or no coolant flow is temporarily received in the low-temperature cooling system. The cooling of the compressed air and the recirculating exhaust gases is thus reduced so that they are substantially not cooled to a lower temperature than the lower threshold value $T_1$. However, a certain inertia in the system may cause the compressed air and the exhaust gases to be for a short period at a somewhat lower temperature than the lower threshold value $T_1$. The lower threshold value $T_1$ is set, however, with a margin such as to provide assurance that the compressed air and the recirculating exhaust gases will not cool down to the critical temperature $T_0$. Such control of the coolant pump 27 eliminates substantially completely the risk of ice forming in the second charge air cooler 10 and the second EGR cooler 15. The lower threshold value $T_1$ and the upper threshold $T_2$ may of course be given values other than those in the example indicated above.

The invention is in no way limited to the embodiment described above but may be varied freely within the scope of the claims. The embodiment example uses a temperature sensor 33 for detecting the temperature $T_A$ of the compressed air after it has been cooled in the second charge air cooler 10 and a temperature sensor 35 for detecting the temperature $T_E$ of the exhaust gases after they have been cooled in the second EGR cooler 15. Alternatively, pressure sensors may be used instead for estimating when ice has begun to form within the second charge air cooler 10 or within the second EGR cooler 15. When the pressure of the air leaving the charge air cooler 10 or the pressure of the exhaust gases leaving the EGR cooler 15 falls below a predetermined pressure value, the control unit 31 may in this case find that ice is beginning to form within one of these coolers 10, 15. The control unit thereupon switches the coolant pump 27 off. The cooling in the charge air cooler 10 and the EGR cooler 15 respectively is thus reduced so that the ice formed quickly melts away. The control unit reactivates the coolant pump 27 as soon as it receives a desired pressure value from said pressure sensor. In the above example, the control unit 31 switches the coolant pump 27 off completely when there is risk of ice formation. It is also possible to reduce the speed of the coolant pump instead of switching it off completely when there is risk of ice formation. The coolant pump 27 will thus deliver to the respective coolers a reduced coolant flow which may be sufficient to prevent ice formation in them. The arrangement is intended for a supercharged combustion engine in which a turbo unit is used for compressing the air which is led to the combustion engine. The arrangement may of course also be used for supercharged combustion engines in which the air is compressed by more than one turbo unit. In such cases the first charge air cooler may be used as an intermediate cooler for cooling the air between the compressions in the compressors of the turbo units.

The invention claimed is:

1. An arrangement for controlling cooling in a supercharged combustion engine, the arrangement comprising:
    a high-temperature cooling system for transmitting a circulating coolant for the cooling of the combustion engine;
    a first cooler for cooling a gaseous medium, which contains water vapour, and which is supplied to the combustion engine, the gaseous medium being cooled by the coolant in the high-temperature cooling system;
    a separate low-temperature cooling system for transmitting a circulating coolant, and a coolant pump connected in the low temperature cooling system and configured to circulate the coolant in the low-temperature cooling system;
    a second cooler for cooling the gaseous medium which contains water vapour, the gaseous medium being cooled by the coolant in the low-temperature cooling system, the gaseous medium being cooled in the second cooler after cooling of the gaseous medium in the first cooler;
    at least one temperature sensor positioned and operable to detect the temperature of the gaseous medium after it has been cooled in the second cooler;
    a control unit configured and operable to receive information from the temperature sensor and to decide whether there is ice formation or risk of ice formation in the second cooler, the control unit being configured and operable to control the coolant pump to be temporarily switched off when the control unit receives a temperature value from the sensor which is below a lower threshold value at which there is a risk of ice formation in the gaseous medium when the gaseous medium is in the second cooler and being configured and operable to control the coolant pump to cause circulation of a normal flow of coolant through the second cooler when the control unit receives a temperature value from the sensor which is above an upper threshold value at which the risk of ice formation is at least temporarily over.

2. The arrangement according to claim 1, wherein the control unit is set such that the lower threshold value is set with a margin to a critical temperature value at which ice formation occurs in the second cooler.

3. The arrangement according to claim 1, wherein the coolant pump is powered electrically.

4. The arrangement according to claim 1, wherein the low-temperature cooling system comprises a radiator element in which the circulating coolant is cooled by air at the temperature of the surroundings.

5. The arrangement according to claim 1, wherein the combustion engine includes an inlet line and the gaseous medium is compressed air which is led in the inlet line to the combustion engine and is led past the first and second coolers.

6. The arrangement according to claim 1, wherein the combustion engine includes a return line and the gaseous medium is recirculating exhaust gases from the combustion engine which are led in the return line to the combustion engine.

7. The arrangement according to claim 1, further comprising a second coolant pump connected to the high-temperature cooling system and configured to circulate the coolant in the high-temperature cooling system.

8. The arrangement according to claim 1, further comprising a line connecting the first cooler and the second cooler, the line conducting the gaseous medium from the first cooler to the second cooler.

9. A method for controllably cooling a gaseous medium used for operation of a supercharged combustion engine, the gaseous medium being supplied to the combustion engine, the method comprising the steps of:
   passing the gaseous medium through a first cooler for a first high temperature cooling of the gaseous medium;
   then passing the gaseous medium through a second cooler for a second low temperature cooling of the gaseous medium;
   circulating a coolant in a high temperature cooling circuit and passing the coolant in a high temperature cooling circuit through the first cooler;
   circulating a coolant through a low temperature cooling circuit and passing the coolant in a low temperature cooling circuit through the second cooler;
   detecting the temperature of the gaseous medium after it has been cooled in the second cooler;
   determining whether there is ice formation or a risk for ice formation in the second cooler when the gaseous medium is passing through the second cooler; and
   controlling the flow of coolant at least through the low temperature cooling circuit so that the flow of coolant there is temporarily switched off when the detected temperature of the gaseous medium is at a value below a lower threshold value at which there is a risk of ice formation in the gaseous medium when the gaseous medium is in the second cooler, and causing circulation of a flow of coolant through at least the second cooler when the detected temperature of the gaseous medium is at a value above an upper threshold value at which the risk of ice formation is at least temporarily over.

10. The method according to claim 9, further comprising a step of passing the gaseous medium through a line connecting the first cooler and the second cooler, which is performed after the step of passing the gaseous medium through the first cooler is performed.

* * * * *